(12) United States Patent
Takahashi (10) Patent No.: US 10,822,035 B2
(45) Date of Patent: Nov. 3, 2020

(54) VEHICLE FRAMEWORK STRUCTURE

(71) Applicant: TOYOTA JIDOSHA KABUSHIKI KAISHA, Toyota-shi (JP)

(72) Inventor: Naoki Takahashi, Miyoshi (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 74 days.

(21) Appl. No.: 16/140,895

(22) Filed: Sep. 25, 2018

(65) Prior Publication Data

US 2019/0144038 A1    May 16, 2019

(30) Foreign Application Priority Data

Nov. 13, 2017    (JP) .................................. 2017-218617

(51) Int. Cl.
*B62D 21/03*    (2006.01)
*B62D 25/02*    (2006.01)
*B62D 27/02*    (2006.01)
*B62D 25/20*    (2006.01)

(52) U.S. Cl.
CPC ........... *B62D 21/03* (2013.01); *B62D 25/025* (2013.01); *B62D 25/2018* (2013.01); *B62D 25/2027* (2013.01); *B62D 25/2036* (2013.01); *B62D 27/023* (2013.01)

(58) Field of Classification Search
CPC ................ B62D 25/025; B62D 27/023; B62D 25/2027; B62D 25/2018; B62D 25/2036; B62D 21/03
See application file for complete search history.

(56) References Cited

U.S. PATENT DOCUMENTS

2009/0289476 A1*  11/2009  Bufe .................. B62D 25/2036
                                                             296/204
2018/0162448 A1    6/2018  Takahashi

FOREIGN PATENT DOCUMENTS

JP        2007-106320      4/2007
JP        2018-95007       6/2018

* cited by examiner

*Primary Examiner* — D Glenn Dayoan
*Assistant Examiner* — Melissa Ann Bonifazi
(74) *Attorney, Agent, or Firm* — Oblon, McClleland, Maier & Neustadt, L.L.P.

(57) ABSTRACT

A vehicle framework structure includes: a pair of rockers extending in a vehicle front-rear direction at both sides in a vehicle width direction; a pair of die-cast members, each die-cast member being joined to at least one of a front end portion or a rear end portion of one of the pair of rockers; a first cross-member extending in the vehicle width direction and being connected to the pair of die-cast members; and a second cross-member provided to the pair of die-cast members, at one of a front side or a rear side in the vehicle front-rear direction relative to the first cross-member, the second cross-member extending in the vehicle width direction and connecting the pair of die-cast members.

6 Claims, 6 Drawing Sheets

VEHICLE FRAMEWORK STRUCTURE

CROSS-REFERENCE TO RELATED APPLICATION

This application claims priority under 35 USC 119 from Japanese Patent Application No. 2017-218617 filed Nov. 13, 2017, the disclosure of which is incorporated by reference herein in its entirety.

BACKGROUND

Technical Field

The present disclosure relates to a vehicle framework structure.

Related Art

Japanese Patent Application Laid-Open (JP-A) No. 2007-106320 discloses a frame structure of a vehicle. This frame structure includes a front frame that structures a framework at a vehicle front portion, a rear frame that structures the framework at a vehicle rear portion, and a middle frame that structures the framework between the front frame and the rear frame.

Standardized units that may selectively alter a length in the vehicle front-rear direction may be attached to one end portions in the vehicle front-rear direction of the front frame and the rear frame. Therefore, because it is easy to lengthen or shorten the vehicle framework in the vehicle front-rear direction, a common framework may be employed for vehicles with different power units, vehicles of different sizes and so forth.

SUMMARY

Methods for employing a common framework in vehicles of different sizes as recited in JP-A No. 2007-106320 include a method in which rockers and cross-members forming a frame structure are connected by die-cast members that are fabricated by die-casting. In this case, when there is a front collision or a rear collision, collision loads tend to concentrate at the die-cast members. Therefore, there is a room for improvement in regard to suppressing deformation of the die-cast members.

In consideration of the circumstances described above, the present disclosure provides a vehicle framework structure that, in a structure in which rockers and cross-members are connected by die-cast members, may suppress deformation of the die-cast members during a front collision or a rear collision.

A vehicle framework structure according to a first aspect of the present disclosure includes: a pair of rockers that extend in a vehicle front-rear direction at both sides in a vehicle width direction; a pair of die-cast members, each die-cast member is joined to at least one of a front end portion or a rear end portion of one of the pair of rockers; a first cross-member that extends in the vehicle width direction and that is connected to the pair of die-cast members; and a second cross-member that is provided to the die-cast members at one of a front side or a rear side in the vehicle front-rear direction relative to the first cross-member, the second cross-member extends in the vehicle width direction and connects the pair of die-cast members.

In the vehicle framework structure of the first aspect, each die-cast member is joined to one or both of the front end portion and the rear end portion of one of the pair of rockers that extends in the vehicle front-rear direction. The pair of die-cast members are connected together by the first cross-member extending in the vehicle width direction. Therefore, because the rockers are connected to the first cross-member by the die-cast members, there is no need to specify joining portions for the first cross-member at the rockers. Consequently, application of the framework structure to vehicles of different sizes is easier.

The second cross-member extending in the vehicle width direction is provided to the pair of die-cast members, at the front side or the rear side in the vehicle front-rear direction of the first cross-member. The pair of die-cast members are connected together by the second cross-member. When a front collision or a rear collision occurs, one of the pair of die-cast members acts to deform in the vehicle width direction when a collision load is applied thereto. However, this deformation may be suppressed by the second cross-member that connects together the pair of die-cast members. The meaning of the term "(the second cross-member is provided) to the die-cast members, at the front side or the rear side in the vehicle front-rear direction of the first cross-member" indicates, in a case in which the die-cast members are joined to and connected by the first cross-member at front end portions of the rockers, "the front side" means a location at a front side in the vehicle front-rear direction relative to the first cross-member, and in a case in which the die-cast members are joined to and connected by the first cross-member at rear end portions of the rockers, "the rear side" means a location at a rear side in the vehicle front-rear direction relative to the first cross-member.

In a vehicle framework structure according to a second aspect of the present disclosure, in the first aspect, each of the pair of die-cast members is joined to the rear end portion of one of the rockers and, as viewed from a vehicle rear side, a cross-sectional shape of each die-cast member is a hat shape that is open to a vehicle width direction outer side of each of the pair of die-case members; an inflected portion that is recessed to a vehicle width direction inner side in plan view is formed at a rear end portion of each of the pair of die-cast members; and an outer panel is joined to the inflected portion such that the rear end portion of each of the pair of die-cast members forms a closed-cross section structure.

In the vehicle framework structure of the second aspect, each of the pair of die-cast members is joined to the rear end portion of one of the pair of the rockers, and the cross-sectional shape of each die-cast member as viewed from the vehicle rear side is the hat shape that is open to the vehicle width direction outer side of the each die-cast member. The inflected portion that is recessed to the vehicle width direction inner side in plan view is formed at the rear end portion of each of the pair of die-cast members. The outer panel is joined to the inflected portion such that the rear end portion of each of the pair of die-cast members is formed as a closed-cross section structure. Therefore, stiffness of the die-cast members may be improved. Furthermore, although tensile stress acts on one of the inflected portions formed at the die-cast members during a rear collision, the outer panel bears a portion of the tensile stress. Therefore the tensile stress acting on the die-cast member may be moderated.

In a vehicle framework structure according to a third aspect of the present disclosure, in the second aspect, an end portion at a vehicle width direction outer side of the outer panel is configured to be joined to a framework member which has a closed-cross section structure.

In the vehicle framework structure of the third aspect, the end portion at the vehicle width direction outer side of each outer panel is joined to the framework member. Therefore, the origin of a moment acting on the die-cast member during a rear collision may be set to a region of the join with the framework member. Thus, deformation of the die-cast member may be suppressed more effectively than in a structure in which an end portion at a vehicle width direction outer side of an outer panel is joined to a die-cast member.

In a vehicle framework structure according to a fourth aspect of the present invention, in the second aspect or the third aspect, the second cross-member is provided at a vehicle rear side relative to a front end portion of the inflected portion of each of the pair of die-cast members.

In the vehicle framework structure of the fourth aspect, the second cross-member is provided at the vehicle rear side relative to the front end portion of the inflected portions of each of the pare of die-cast members. Forces in the vehicle width direction during a rear collision are likely to act on regions of the die-cast members at the vehicle rear side relative to the front end portions of the inflected portions. Therefore, deformations of the regions in the vehicle width direction may be suppressed effectively by the second cross-member being provided at these regions.

According to the vehicle framework structure of the first aspect, an excellent effect is provided in that, in a structure in which rockers and cross-members are connected by die-cast members, deformation of the die-cast members during a front collision or during a rear collision may be suppressed.

According to the vehicle framework structure of the second aspect, an excellent effect is provided in that tensile stresses acting on the die-cast members may be moderated.

According to the vehicle framework structure of the third aspect, an excellent effect is provided in that moments acting on the die-cast members may be moderated.

According to the vehicle framework structure of the fourth aspect, an excellent effect is provided in that deformations of the die-cast members in the vehicle width direction may be suppressed effectively.

DETAILED DESCRIPTION

Below, a vehicle framework structure according to the present disclosure is described using FIG. 1 to FIG. 6. An arrow FR that is shown where appropriate in the drawings indicates a vehicle front side, an arrow UP indicates a vehicle upper side, and an arrow RH indicates a vehicle width direction right side. Herebelow, where descriptions are given simply using the directions front, rear, up, down, left and right, unless otherwise specified, these represent the front-rear in the vehicle front-rear direction, up and down in the vehicle vertical direction, and left and right in the vehicle width direction if facing in a progress direction.

Figure 1:
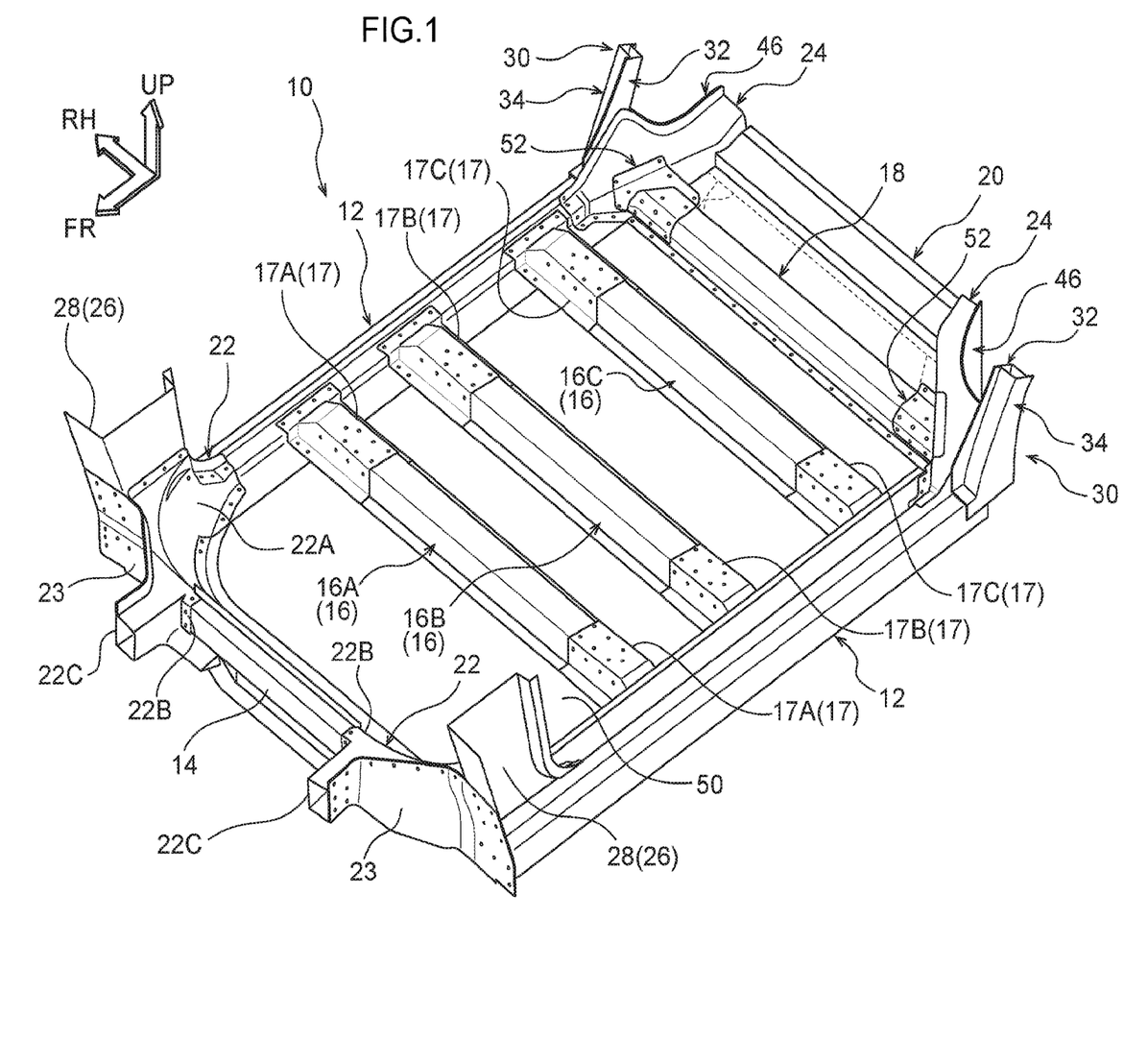
FIG. 1 is a perspective view showing a whole frame of a vehicle in which a vehicle framework structure according to an exemplary embodiment of the present disclosure is employed.

As shown in FIG. 1, a vehicle 10 in which the vehicle framework structure is employed principally includes rockers 12, a front cross-member 14, floor cross-members 16, a rear cross-member 18 that serves as a first cross-member, a reinforcing cross-member 20 that serves as a second cross-member, front side die-cast members 22, and rear side die-cast members 24.

Figure 4:
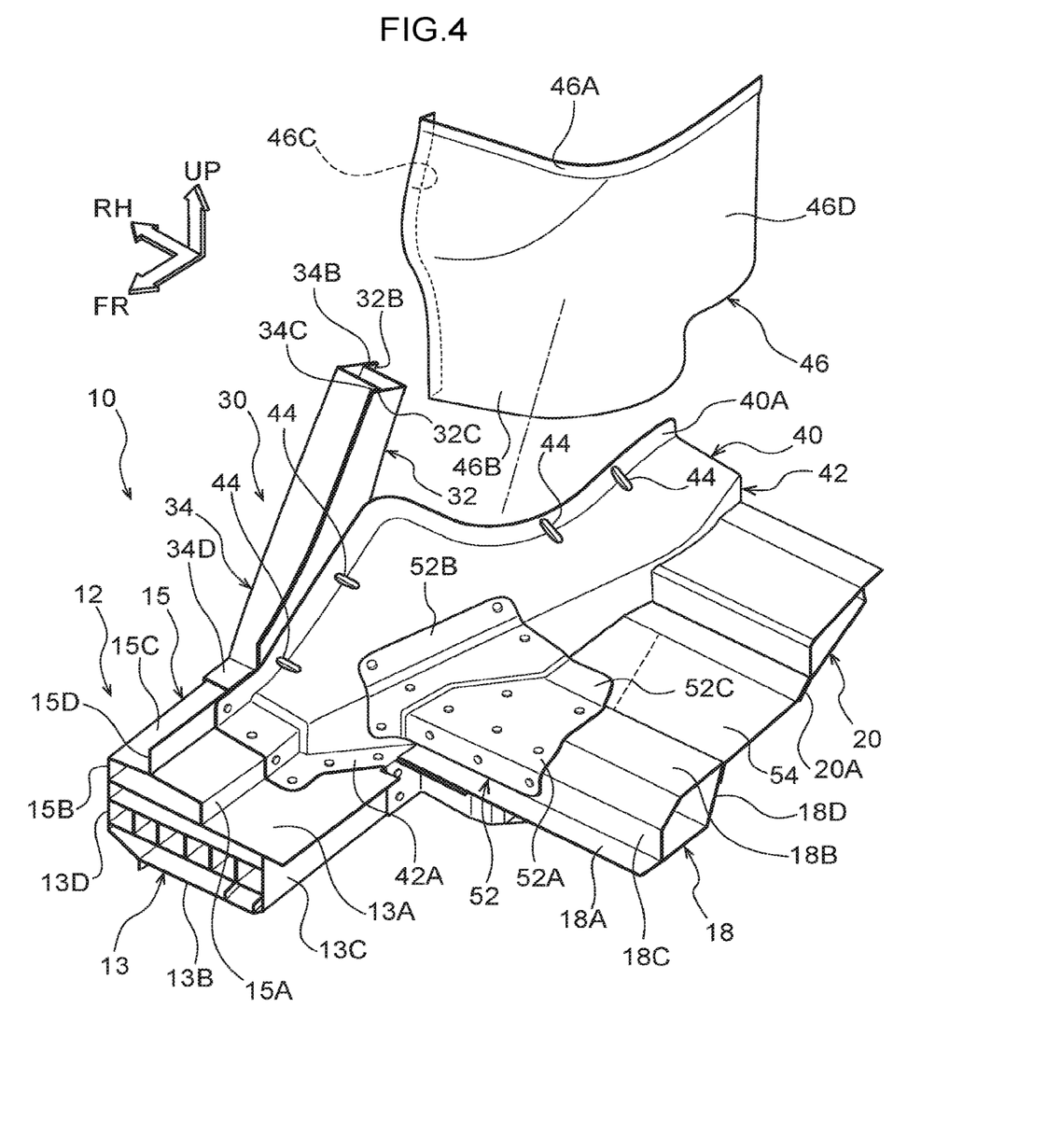
FIG. 4 is a view showing the principal portions of the vehicle in which the vehicle framework structure according to the exemplary embodiment of the present disclosure is employed, which is an exploded perspective view showing a state in which an outer panel is removed.

The rockers 12 are provided as a left and right pair extending in the vehicle front-rear direction at both sides of the vehicle width direction. As illustrated in FIG. 4, each rocker 12 is formed by extrusion molding. As an example in the present exemplary embodiment, the rockers 12 are formed by extrusion molding of an aluminium alloy.

To be specific, each rocker 12 is provided with a lower side portion 13 that structures a lower side thereof and an upper side portion 15 that structures an upper side thereof. In a cross section seen in the vehicle front-rear direction, the lower side portion 13 is formed in a substantially rectangular shape. The lower side portion 13 is formed as a chamber structure by a lower side upper face 13A, a lower side lower face 13B, a lower side inner face 13C and a lower side outer face 13D. An internal cavity of the lower side portion 13 is plurally partitioned and is structured so as to function as an impact absorption region during a side collision.

The upper side portion 15 is provided integrally with the lower side upper face 13A of the lower side portion 13. The upper side portion 15 is disposed at the lower side upper face 13A, at a vehicle width direction outer side of the lower side upper face 13A. The upper side portion 15 includes an upper side inner face 15A standing upright from the lower side upper face 13A, an upper side outer face 15B and an upper side upper face 15C. An upper rib 15D projects to a vehicle upper side from a vehicle width direction central portion of the upper side upper face 15C. An end portion at the vehicle width direction inner side of the lower side upper face 13A of the lower side portion 13 projects further to a vehicle width direction inner side than the lower side inner face 13C. A battery case, which is not shown in the drawings, is fixed to this projected portion of the lower side upper face 13A.

As shown in FIG. 1, a center pillar 26 is joined to a front end portion of the rocker 12. The center pillar 26 includes a center pillar inner panel 28 that extends in the vehicle vertical direction. In a sectional plan view, the center pillar inner panel 28 is formed substantially in a hat shape that is open to a vehicle width direction outer side of the center pillar inner panel 28. A center pillar outer panel, which is not shown in the drawings, is joined to a vehicle width direction outer side of the center pillar inner panel 28 to form a chamber structure.

In this exemplary embodiment, the front side die-cast members 22 are joined to the front end portions of the rockers 12. Each front side die-cast member 22 is an item fabricated by die-casting (metal mold casting) and is formed substantially in an "L" shape in plan view. The front side die-cast members 22 are provided as a left and right pair at the front end portions of the corresponding rockers 12.

A rocker joining portion 22A that corresponds with the external shape of the rocker 12 is formed at a rear portion of each front side die-cast member 22. The rocker joining portion 22A is joined to the front end portion of the rocker 12 by fastening members such as rivets or the like. A cross joining portion 22B that projects to a vehicle width direction inner side is formed at a front portion of the front side die-cast member 22. The cross joining portion 22B is joined to the front cross-member 14, which is described below, by fastening members such as rivets or the like. A protruding portion 22C is formed so as to project toward to vehicle front side from the proximal end side of the cross joining portion 22B. A front side member, which is not shown in the drawings, is joined to the protruding portion 22C.

A front side outer panel 23 is joined to a vehicle front side of the front side die-cast member 22 by fastening members such as rivets or the like. The front side outer panel 23 is formed by bending of a metal plate. The front side outer panel 23 is joined to the front side die-cast member 22 and thus forms a closed cross-section structure.

The front cross-member 14 is disposed at a vehicle front side relative to the front end portions of the rockers 12 and extends in the vehicle width direction. Two end portions in the vehicle width direction of the front cross-member 14 are joined to the cross joining portions 22B of the front side die-cast members 22.

The floor cross-members 16 are disposed at a vehicle rear side relative to the front cross-member 14. The floor cross-members 16 are disposed between the pair of rockers 12. In the present exemplary embodiment, three of the floor cross-members 16 are arranged (a floor cross-member 16A, a floor cross-member 16B and a floor cross-member 16C).

The floor cross-member 16A is disposed at a vehicle front side, is formed substantially in a hat shape in cross section that is open to a vehicle lower side, and is joined to an upper side of a floor panel 50. Two vehicle width direction end portions of the floor cross-member 16A are respectively joined to the rockers 12 via patches 17A. The patches 17A are formed in shapes that correspond with the floor cross-member 16A and are provided at each of the two vehicle width direction end portions of the floor cross-member 16A. Vehicle width direction outer sides of the patches 17A are superposed with the rockers 12 and are joined to the rockers 12 by fastening members such as rivets or the like. Vehicle width direction inner sides of the patches 17A are superposed with the floor cross-member 16A and are joined to the floor cross-member 16A by fastening members such as rivets or the like.

The floor cross-member 16B is disposed at a vehicle rear side relative to the floor cross-member 16A. The floor cross-member 16B is disposed to be substantially parallel with the floor cross-member 16A, is formed in a substantial hat shape in cross section that is open to a vehicle lower side thereof, and is joined to the upper side of the floor panel 50. Two vehicle width direction end portions of the floor cross-member 16B are joined to the rockers 12 via patches 17B with similar shapes to the patches 17A.

The floor cross-member 16C is disposed at a vehicle rear side relative to the floor cross-member 16B. The floor cross-member 16C is disposed to be substantially parallel with the floor cross-member 16A and the floor cross-member 16B, is formed in a substantial hat shape in cross section that is open to the vehicle lower side thereof, and is joined to the upper side of the floor panel 50. Two vehicle width direction end portions of the floor cross-member 16C are joined to the rockers 12 via patches 17C with similar shapes to the patches 17A.

Rear pillars 30 that serve as framework members are joined to respective rear end portions of the left and right rockers 12. Each rear pillar 30 extends in the vehicle vertical direction and is formed as a chamber structure including a rear pillar inner panel 32 and a rear pillar outer panel 34.

Figure 6:
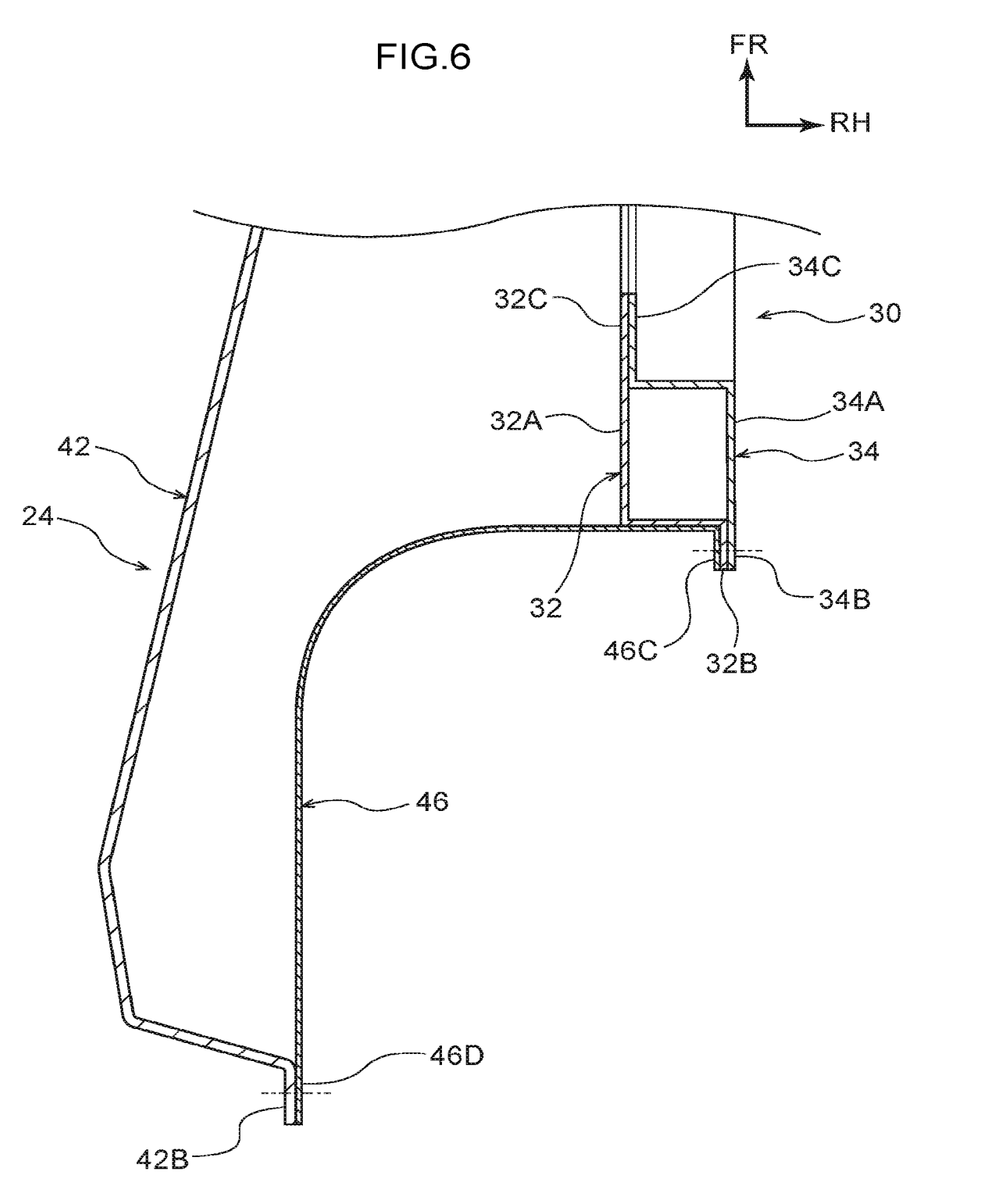
FIG. 6 is a magnified sectional plan view, seen from the vehicle upper side, showing the principal portions of the vehicle in which the vehicle framework structure according to the exemplary embodiment of the present disclosure is employed.

As shown in FIG. 4 and FIG. 6, the rear pillar inner panel 32 includes an inner side main body portion 32A, an inner side rear flange portion 32B and an inner side front flange portion 32C. The inner side main body portion 32A is formed in a substantial "L" shape in a plan sectional view, structured by a portion that extends in the vehicle front-rear direction and a portion that extends to a vehicle width direction outer side from a rear end portion of that portion. The inner side rear flange portion 32B projects toward a vehicle rear side from an end portion at the vehicle width direction outer side of the inner side main body portion 32A. The inner side front flange portion 32C continues from a front end portion of the inner side main body portion 32A and projects toward a vehicle front side.

The rear pillar outer panel 34 includes an outer side main body portion 34A, an outer side rear flange portion 34B and an outer side front flange portion 34C. The outer side main body portion 34A is formed in a substantial "L" shape in the plan sectional view, structured by a portion that extends in the vehicle width direction and a portion that extends to the vehicle rear side from an end portion at the vehicle width direction outer side of that portion. The outer side rear flange portion 34B continues from a rear end portion of the outer side main body portion 34A and projects toward a vehicle rear side. The outer side rear flange portion 34B and the inner side rear flange portion 32B are together joined to a rear side outer panel 46, which is described below.

The outer side front flange portion 34C projects to a vehicle front side from an end portion at the vehicle width direction inner side of the outer side main body portion 34A. The outer side front flange portion 34C and the inner side front flange portion 32C are joined together. Thus, the chamber structure is formed by the rear pillar inner panel 32 and the rear pillar outer panel 34 being joined together.

As shown in FIG. 4, a lower end portion of the rear pillar outer panel 34 is formed as an inflected portion 34D that is inflected toward a vehicle front side along the rocker 12. The inflected portion 34D is superposed with the rocker 12 and joined to the rocker 12 in this state. Although not shown in the drawings, a lower end portion of the rear pillar inner panel 32 is inflected toward a vehicle rear side along the rocker 12 and joined to the rocker 12 in a similar manner to the rear pillar outer panel 34. An upper end portion of the rear pillar 30 is joined to a roof rail, which is not shown in the drawings.

As shown in FIG. 1, the rear side die-cast members 24 are disposed at the corresponding vehicle width direction inner sides of the left and right rear pillars 30. Each rear side die-cast member 24 is a member fabricated by die-casting (metal mold casting) and is joined to a rear end portion of the rocker 12.

Figure 2:
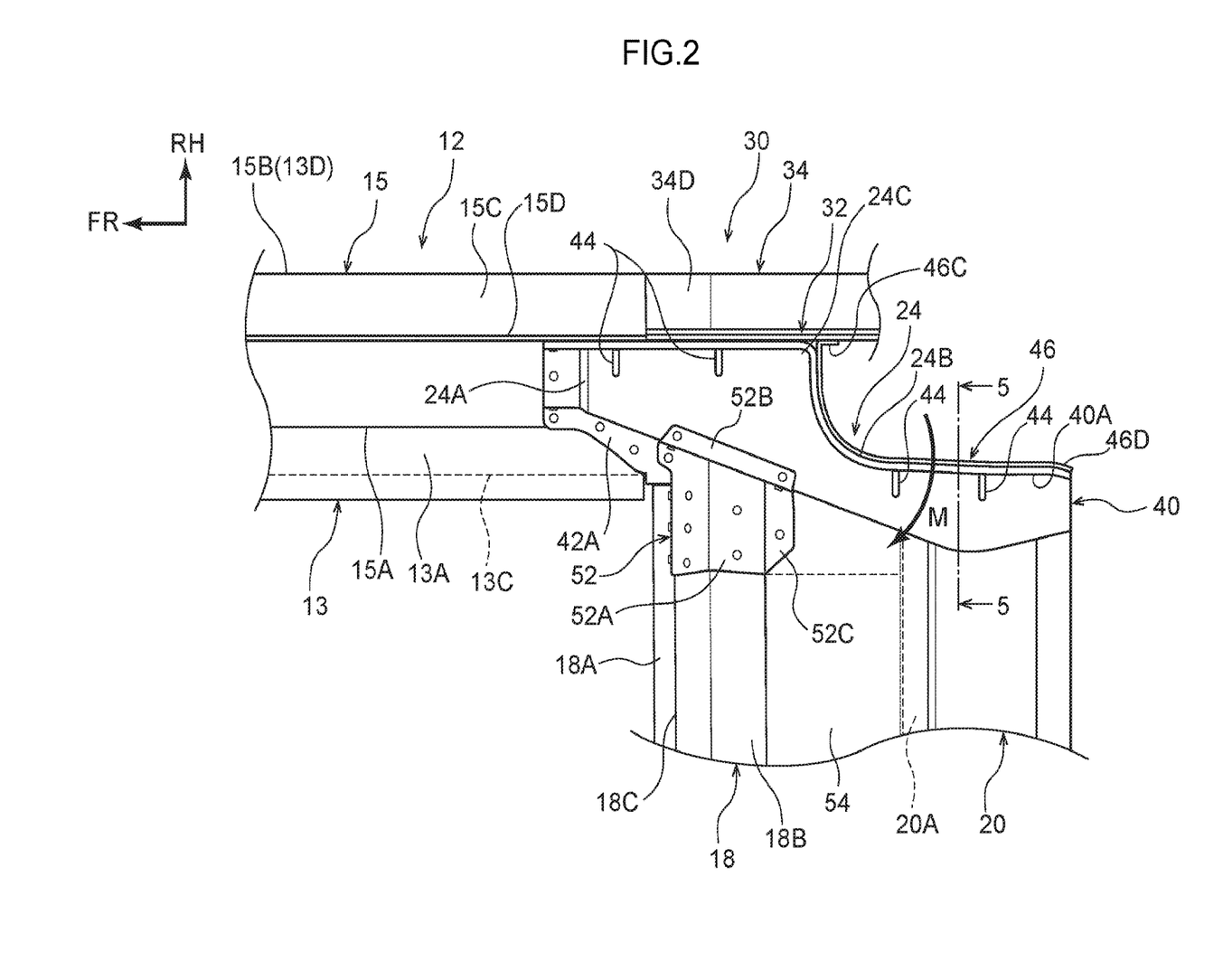
FIG. 2 is a plan view showing principal portions of the vehicle in which the vehicle framework structure according to the exemplary embodiment of the present disclosure is employed.
Figure 3:
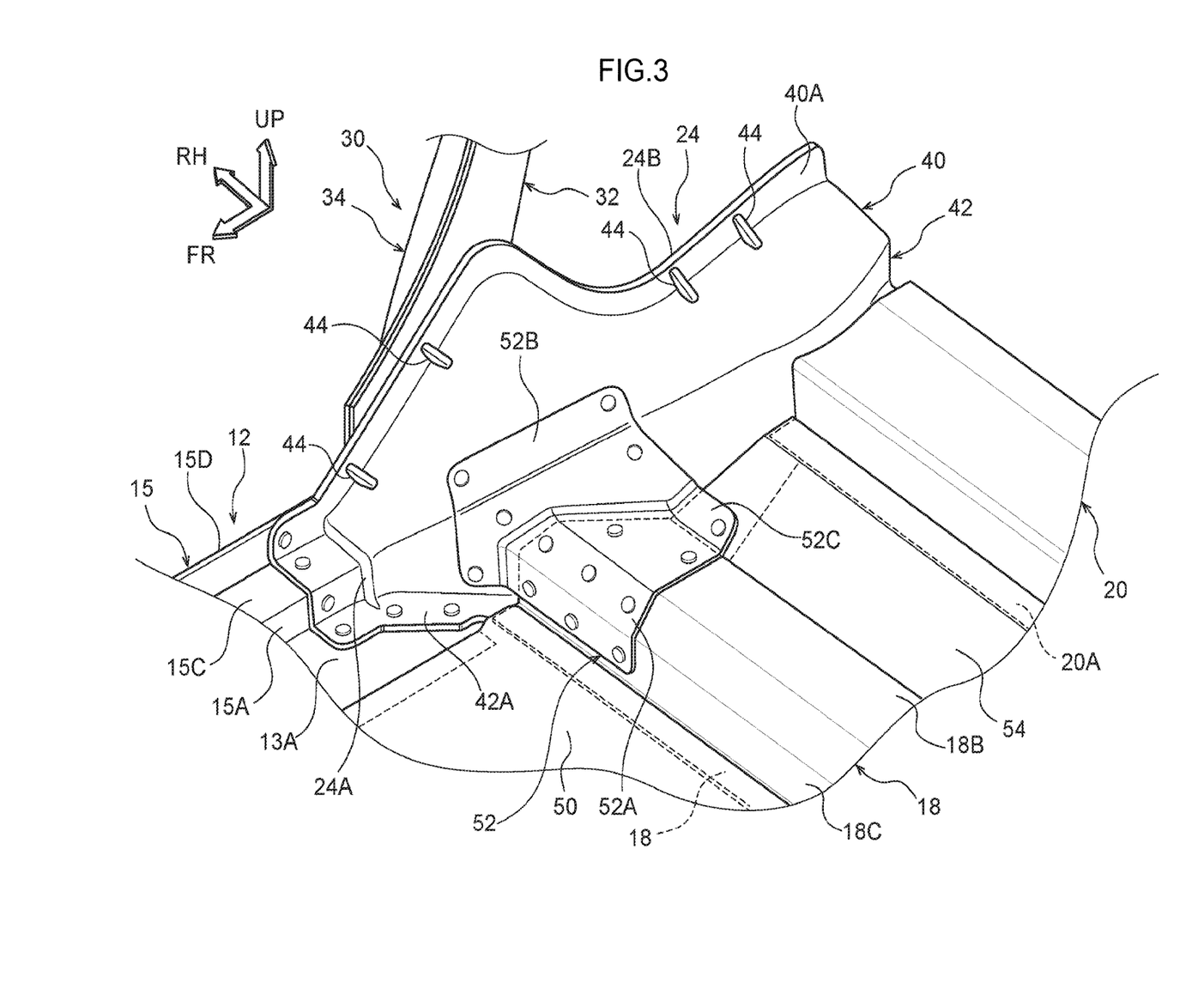
FIG. 3 is a perspective view showing the principal portions of the vehicle in which the vehicle framework structure according to the exemplary embodiment of the present disclosure is employed.

As shown in FIG. 2 and FIG. 3, the rear side die-cast member 24 extends in the vehicle front-rear direction in a plan view, and a front end portion of the rear side die-cast member 24 is joined to the rear end portion of the rocker 12.

Figure 5:
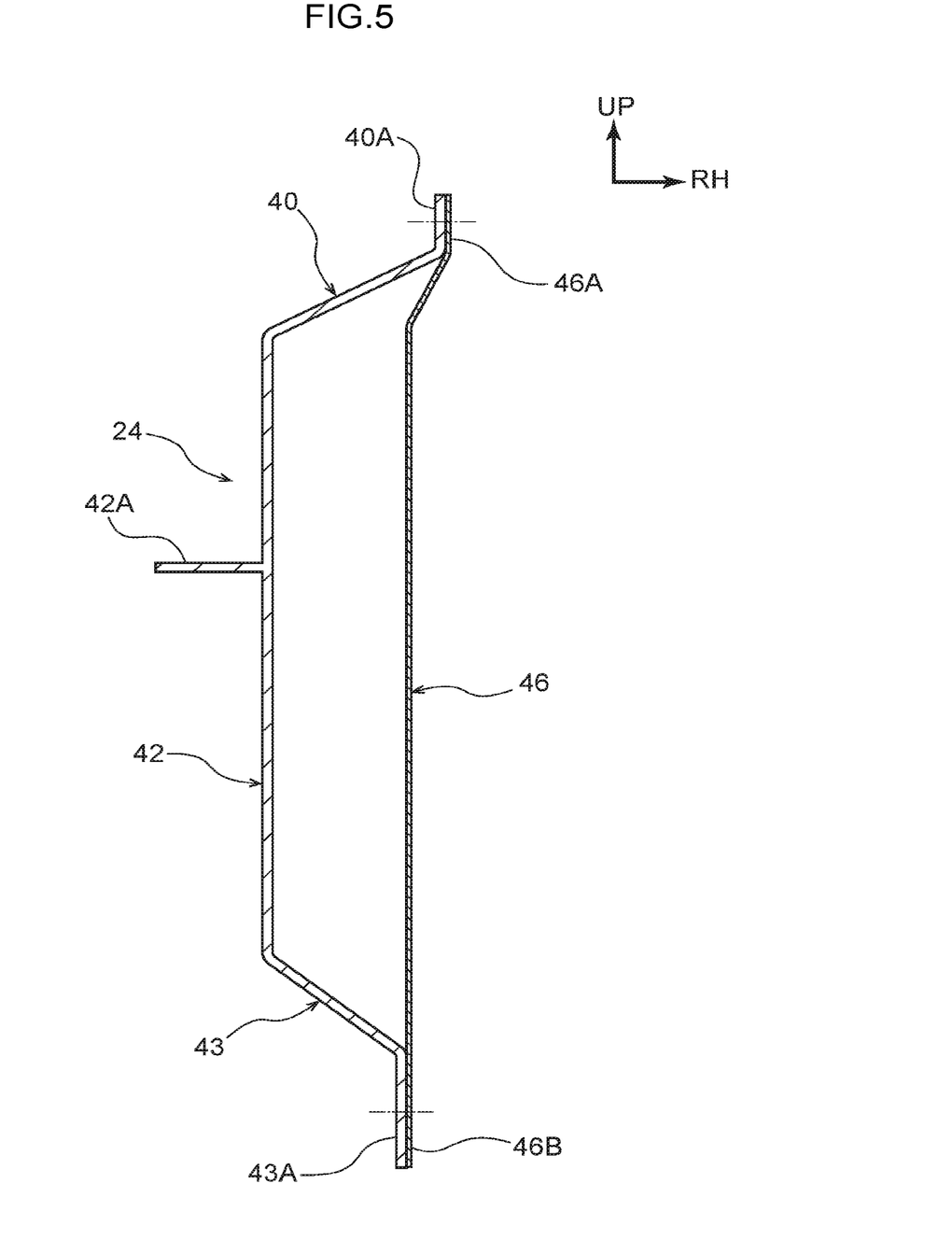
FIG. 5 is a magnified sectional diagram showing a state cut along line 5-5 in FIG. 2.

A cross-sectional shape of the rear side die-cast member 24 viewed from the vehicle rear side is formed in a hat shape that is open to a vehicle width direction outer side (see FIG. 5).

The rear side die-cast member 24 includes an upper wall portion 40 and a side wall portion 42. The upper wall portion 40 is angled to a vehicle upper side with extending toward a vehicle width direction outer side. An upper flange portion 40A projects to a vehicle upper side from an upper end portion (an end portion at the vehicle width direction outer side) of the upper wall portion 40. Ribs 44 are provided between the upper wall portion 40 and the upper flange portion 40A. In the present exemplary embodiment, four of the ribs 44 are provided along the vehicle front-rear direction. The side wall portion 42 extends to a vehicle lower side from a lower end portion (an end portion at the vehicle width direction inner side) of the upper wall portion 40. A middle flange portion 42A projects to a vehicle width direction inner side from a vertical direction central portion of the side wall portion 42 (see FIG. 5).

A step portion 24A is provided at a front end portion of the upper wall portion 40 and a front end portion of the side wall portion 42. A portion at a vehicle front side of the upper wall portion 40 is disposed at a vehicle lower side relative to the step portion 24A. In a state in which the upper wall portion 40 is superposed with the upper side upper face 15C of the rocker 12, the portion at the vehicle front side of the upper wall portion 40 is joined to the upper side upper face 15C by fastening members such as rivets or the like. In a state in which a portion of the upper flange portion 40A is superposed with the upper rib 15D of the rocker 12, the portion of the upper flange portion 40A is joined to the upper rib 15D by fastening members such as rivets or the like.

A portion at a vehicle front side of the side wall portion 42 is disposed at a vehicle width direction outer side relative to the step portion 24A. In a state in which the portion at the vehicle front side of the side wall portion 42 is superposed with the upper side inner face 15A of the rocker 12, the portion of the side wall portion 42 is joined to the upper side inner face 15A by fastening members such as rivets or the like. In addition, in a state in which the middle flange portion 42A is superposed with the lower side upper face 13A of the rocker 12, the middle flange portion 42A is joined to the lower side upper face 13A by fastening members such as rivets or the like.

As shown in FIG. 5, a lower wall portion 43 projects to a vehicle width direction outer side from a lower end portion of the side wall portion 42. The lower wall portion 43 is angled to a vehicle lower side with projecting toward the vehicle width direction outer side. A lower flange portion 43A projects to a vehicle lower side from a lower end portion of the lower wall portion 43.

As shown in FIG. 2, an inflected portion 24B that is recessed toward a vehicle width direction inner side in plan view is formed at a rear end portion of the rear side die-cast member 24. Accordingly, an external shape in plan view of the rear side die-cast member 24 at the vehicle width direction outer side is indented to the vehicle width direction inner side from a vehicle front-rear direction central portion of the rear side die-cast member 24. A vehicle front side of the rear side die-cast member 24 at a vehicle width direction inner side is inflected to form a protrusion and extends to the vehicle rear side.

The rear side outer panel 46 is joined to the inflected portion 24B of the rear side die-cast member 24. The rear side outer panel 46 is formed of a metal plate member and is inflected to correspond with an external shape of the inflected portion 24B. As shown in FIG. 5, an upper flange portion 46A projects to a vehicle upper side from an upper end portion of the rear side outer panel 46. In a state in which the upper flange portion 46A is superposed with the upper flange portion 40A of the rear side die-cast member 24, the upper flange portion 46A is joined to the upper flange portion 40A. A lower flange portion 46B projects to a vehicle lower side from a lower end portion of the rear side outer panel 46. In a state in which the lower flange portion 46B is superposed with the lower flange portion 43A of the rear side die-cast member 24, the lower flange portion 46B is joined to the lower flange portion 43A. Thus, viewed from the vehicle rear side, the rear side die-cast member 24 and the rear side outer panel 46 form a closed cross-section structure.

As shown in FIG. 6, an outer flange portion 46C projects to a vehicle rear side from an end portion at the vehicle width direction outer side of the rear side outer panel 46. In a state in which the outer flange portion 46C is superposed with both the outer side rear flange portion 34B and the inner side rear flange portion 32B of the rear pillar 30, the outer flange portion 46C is joined together therewith by fastening members such as rivets or the like.

An inner flange portion 46D projects to a vehicle rear side from an end portion of the vehicle width direction inner side of the rear side outer panel 46. A rear flange portion 42B is formed at a rear end portion of the side wall portion 42 of the rear side die-cast member 24. In a state in which the inner flange portion 46D is superposed with the rear flange portion 42B, the inner flange portion 46D is joined to the rear flange portion 42B by fastening members such as rivets or the like.

As shown in FIG. 1, the rear cross-member 18 is joined to front portions of the rear side die-cast members 24. The rear cross-member 18 extends in the vehicle width direction and is connected to the pair of rear side die-cast members 24.

As shown in FIG. 4, the rear cross-member 18 is structured as a chamber with a substantially rectangular cross section as seen in the vehicle width direction. A front flange portion 18A projects to a vehicle front side from a front end portion of the rear cross-member 18. An end portion at a right outer side in the vehicle width direction of the front flange portion 18A is superposed with and joined to an upper side of the middle flange portion 42A of the corresponding rear side die-cast member 24. As shown in FIG. 3, in a state in which a rear end portion of the floor panel 50 is superposed with an upper face of the front flange portion 18A, the floor panel 50 is joined to the upper face of the front flange portion 18A.

Patches 52 are attached to a front face portion 18C and an upper face portion 18B of the rear cross-member 18. The rear cross-member 18 is connected to the rear side die-cast members 24 via these patches 52. The front face portion 18C of the rear cross-member 18 extends to a vehicle upper side from the rear end of the front flange portion 18A. The upper face portion 18B includes an angled face, which extends diagonally to a vehicle upper side toward a vehicle rear side from an upper end portion of the front face portion 18C, and a horizontal face, which extends to a vehicle rear side from a rear end portion (upper end portion) of the angled face. An end portion 52A at the vehicle width direction inner side of each patch 52 is formed in a shape that corresponds with the front face portion 18C and the upper face portion 18B. In a state in which the end portion 52A is superposed with the front face portion 18C and upper face portion 18B, the end portion 52A is joined to the front face portion 18C and upper face portion 18B by fastening members such as rivets or the like.

An end portion 52B at the vehicle width direction outer side of the patch 52 is inflected along the upper wall portion 40 and side wall portion 42 of the rear side die-cast member 24. In a state in which the end portion 52B is superposed with the upper wall portion 40 and side wall portion 42, the end portion 52B is joined to the upper wall portion 40 and side wall portion 42 by fastening members such as rivets or the like.

A corner portion 52C provided at an end portion at the vehicle width direction inner side of a rear end portion of the patch 52 is superposed on a connecting plate 54 that connects the rear cross-member 18 with the reinforcing cross-member 20. The corner portion 52C is joined to the connecting plate 54 by fastening members such as rivets or the like. Similar structures are also formed at an end portion at the vehicle left side of the rear cross-member 18.

As shown in FIG. 1, the reinforcing cross-member 20 is provided at a vehicle rear side (the vehicle front-rear direction rear side) of the rear side die-cast member 24 relative to the rear cross-member 18. The reinforcing cross-member 20 is a member that extends in the vehicle width direction and connects the pair of rear side die-cast members 24 together. Seen in the vehicle width direction, the reinforcing cross-member 20 is a chamber structure with a substantially rectangular cross section (see FIG. 4).

As shown in FIG. 2, the reinforcing cross-member 20 is disposed at a vehicle rear side relative to a front end portion 24C of the inflected portion 24B of each rear side die-cast member 24. As shown in FIG. 3, a front flange portion 20A projects toward a vehicle front side from a front end portion of the reinforcing cross-member 20. An end portion at the vehicle width direction outer side of the front flange portion 20A is superposed on and joined to the middle flange portion 42A of the rear side die-cast member 24. In a state in which a rear end portion of the connecting plate 54 is superposed with an upper face of the front flange portion 20A, the connecting plate 54 is joined to the front flange portion 20A. Similarly to the rear cross-member 18, structures may be formed that connect the reinforcing cross-member 20 with the rear side die-cast members 24 via patches.

—Operation and Effects—

Now, operation and effects of the present exemplary embodiment are described.

In the present exemplary embodiment, the rear side die-cast members 24 are joined to the corresponding rear end portions of the pair of rockers 12, and the pair of rear side die-cast members 24 are connected in the vehicle width direction by the rear cross-member 18 that extends in the vehicle width direction. Therefore, due to the structure in which the rockers 12 and the rear cross-member 18 are connected by the rear side die-cast members 24, there is no need to specify joining portions for the rear cross-member 18 at the rockers 12. As a result, a structure is formed that is easier to apply to vehicles of different sizes. That is, when this structure is to be applied to a vehicle with a long overall length, rockers that are longer in the vehicle front-rear direction may be employed in place of the rockers 12. In this case, because the rear end portions of these rockers are joined to the rear side die-cast members 24, the rear cross-member 18 and the rockers do not need to be joined directly, and there is no need to machine joining portions or the like for the rear cross-member 18 at the rockers beforehand.

In the present exemplary embodiment, the reinforcing cross-member 20 is provided to the rear side die-cast members 24 at the vehicle rear side of the rear cross-member 18, and the pair of rear side die-cast members 24 are connected together by the reinforcing cross-member 20. During a rear collision, when a collision load is applied to the rear side die-cast members 24, the rear side die-cast members 24 act to deform toward the vehicle width direction inner sides thereof. At this time, deformation of the rear side die-cast members 24 may be suppressed due to the pair of rear side die-cast members 24 being connected together by the reinforcing cross-member 20 as in the present exemplary embodiment. Therefore, cases of the rear side die-cast members 24 breaking and the reinforcing cross-member 20, rear cross-member 18 and the like advancing toward the vehicle front side (a vehicle inner side) may be suppressed. In particular, in a vehicle in which a battery case is disposed at a lower face side of the floor panel 50, the application of a load to the battery may be avoided.

In the present exemplary embodiment, as shown in FIG. 4 and FIG. 5, the cross-sectional shape of each rear side die-cast member 24 viewed from the vehicle rear side is the hat shape that opens to the vehicle width direction outer side, and the inflected portion 24B is formed at the rear end portion of the rear side die-cast member 24. The rear side outer panel 46 is joined to the inflected portion 24B, forming the closed cross-section structure. Therefore, stiffness of the rear side die-cast member 24 may be improved and deformation of the rear side die-cast member 24 may be suppressed. During a rear collision, tensile stress acts on the inflected portion 24B formed at the rear side die-cast member 24. However, because the rear side outer panel 46 bears a portion of the tensile stress, the tensile stress acting on the rear side die-cast member 24 may be moderated.

In the present exemplary embodiment, as shown in FIG. 6, the outer flange portion 46C at the vehicle width direction outer side of the rear side outer panel 46 is joined to the rear pillar 30, which is a framework member. As illustrated by arrow M in FIG. 2, a moment "M" may act on the rear side die-cast member 24 during a rear collision. In this situation, the origin of the moment is the joining portion between the rear side outer panel 46 and the rear pillar 30. Therefore, the moment acting on the rear side outer panel 46 may be moderated. That is, deformation of the rear side die-cast member 24 may be suppressed more effectively than in a structure in which the outer flange portion 46C of the rear side outer panel 46 is joined to the rear side die-cast member 24.

In the present exemplary embodiment, the reinforcing cross-member 20 is provided at the vehicle rear side of each rear side die-cast member 24 relative to the front end portion 24C of the inflected portion 24B. Because the vehicle front side of the rear side die-cast member 24 relative to the inflected portion 24B is arranged along the rocker 12, the vehicle front side of the rear side die-cast member 24 is resistant to deformation in the vehicle width direction. A force in the vehicle width direction during a rear collision is likely to act on a region at the vehicle rear side of the rear side die-cast member 24 relative to the front end portion 24C of the inflected portion 24B. Because the reinforcing cross-member 20 is provided in this region, the reinforcing cross-member 20 braces between the pair of rear side die-cast members 24 and deformation in the vehicle width direction may be suppressed effectively.

As described above, a vehicle framework structure according to the exemplary embodiment has been described, but it will be clear that numerous modes may be embodied within a scope that does not depart from the scope of the present disclosure. For example, in the present exemplary embodiment, the reinforcing cross-member 20 is provided at the vehicle rear side of the rear side die-cast members 24 relative to the rear cross-member 18, but this is not limiting. The reinforcing cross-member 20 may be provided at the vehicle front side relative to the front cross-member 14. In this case, the reinforcing cross-member 20 is provided at a vehicle front side of the front side die-cast members 22 relative to the front cross-member 14 in FIG. 1, and the pair of front side die-cast members 22 are connected together by the reinforcing cross-member 20. Consequently, cases of the front side die-cast members 22 acting to deform in the vehicle width direction when a collision load is applied to the front side die-cast members 22 during a front collision may be suppressed by the reinforcing cross-member 20. That is, in this structure, the front side die-cast members 22 correspond to the die-cast member of the present disclosure, and the front cross-member 14 corresponds to the first cross-member of the present disclosure. A structure is also possible in which reinforcing cross-members are provided at both the vehicle rear side of the rear cross-member 18 and the vehicle front side of the front cross-member 14.

In the present exemplary embodiment, as shown in FIG. 6, the outer flange portion 46C formed at the end portion at the vehicle width direction outer side of each rear side outer panel 46 is joined to the rear pillar 30, but this is not limiting. For example, a structure in which the outer flange portion 46C is joined to the rocker 12, which is a framework member with a chamber structure similar to the rear pillar 30, provides similar effects to the present exemplary embodiment. That is, deformation of the rear side die-cast member 24 may be suppressed compared to a structure in which the outer flange portion 46C of the rear side outer panel 46 is joined to the rear side die-cast member 24.

In the present exemplary embodiment, as shown in FIG. 2, the inflected portion 24B that is recessed to the vehicle width direction inner side in plan view is formed at the rear end portion of each rear side die-cast member 24, but this is not limiting; the shape of the inflected portion 24B may be modified. Further, a rear side die-cast member that is not provided with the inflected portion 24B may be employed.

In the present exemplary embodiment, as shown in FIG. 5, a closed cross-section structure is formed by the rear side die-cast member 24 and rear side outer panel 46 as seen from the vehicle rear side, but this is not limiting. In a structure in which tensile stress applied to the rear side die-cast member 24 during a rear collision can be borne by the rear side outer panel 46, deformation of the rear side die-cast member 24 may be suppressed even if the rear side die-cast member 24 and rear side outer panel 46 do not structure a closed cross-section.

What is claimed is:

1. A vehicle framework structure comprising:
   a pair of rockers extending in a vehicle front-rear direction at both sides in a vehicle width direction;
   a pair of die-cast members, each die-cast member being joined to at least one of a front end portion or a rear end portion of one of the pair of rockers;
   a first cross-member extending in the vehicle width direction and being connected to the pair of die-cast members; and
   a second cross-member provided to the pair of die-cast members, at one of a front side or a rear side in the vehicle front-rear direction relative to the first cross-member, the second cross-member extending in the vehicle width direction and connecting the pair of die-cast members.

2. The vehicle framework structure according to claim 1, wherein:
   each of the pair of die-cast members is joined to the rear end portion of one of the pair of rockers and, as viewed from a vehicle rear side, a cross-sectional shape of each of the pair of die-cast members is a hat shape that is open to a vehicle width direction outer side of each of the pair of die-cast members;
   an inflected portion that is recessed to a vehicle width direction inner side in plan view is formed at a rear end portion of each of the pair of die-cast members; and
   an outer panel is joined to the inflected portion such that the rear end portion of each of the pair of die-cast member forms a closed cross-section structure.

3. The vehicle framework structure according to claim 2, wherein an end portion at a vehicle width direction outer side of the outer panel is configured to be joined to a framework member that has a closed cross-section structure.

4. The vehicle framework structure according to claim 2, wherein the second cross-member is provided at a vehicle rear side relative to a front end portion of the inflected portion of each of the pair of die-cast members.

5. The vehicle framework structure according to claim 3, wherein the second cross-member is provided at a vehicle rear side relative to a front end portion of the inflected portion of each of the pair of die-cast members.

6. The vehicle framework structure according to claim 1, wherein the second cross member includes a flange that extends toward the first cross member, and the flange and the first cross member are connected by a connecting member.

* * * * *